(12) United States Patent
Sugimoto

(10) Patent No.: US 8,952,091 B2
(45) Date of Patent: Feb. 10, 2015

(54) RUBBER COMPOSITION FOR INNER LINER AND PNEUMATIC TIRE

(75) Inventor: Mutsuki Sugimoto, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 256 days.

(21) Appl. No.: 13/006,606

(22) Filed: Jan. 14, 2011

(65) Prior Publication Data

US 2011/0178235 A1 Jul. 21, 2011

(30) Foreign Application Priority Data

Jan. 18, 2010 (JP) ................................. 2010-008290

(51) Int. Cl.

| B60C 1/00 | (2006.01) |
|---|---|
| C08L 21/00 | (2006.01) |
| C08K 3/00 | (2006.01) |
| C08L 23/22 | (2006.01) |
| C08C 1/04 | (2006.01) |
| C08K 3/36 | (2006.01) |
| C08L 15/00 | (2006.01) |

(52) U.S. Cl.
CPC ............... *C08L 21/00* (2013.01); *B60C 1/0008* (2013.04); *C08K 3/0033* (2013.01); *C08L 23/22* (2013.01); *C08C 1/04* (2013.01); *C08K 3/36* (2013.01); *C08L 15/00* (2013.01)
USPC ....................................................... 524/575.5

(58) Field of Classification Search
USPC .................................................. 524/492, 495
See application file for complete search history.

(56) References Cited

U.S. PATENT DOCUMENTS

| 4,835,216 | A | 5/1989 | Morikawa et al. |
|---|---|---|---|
| 5,000,092 | A | 3/1991 | Best |
| 5,017,636 | A | 5/1991 | Hattori et al. |
| 5,396,940 | A | 3/1995 | Segatta et al. |
| 5,569,740 | A | 10/1996 | Tanaka et al. |
| 6,306,955 | B1 | 10/2001 | Kawasaki et al. |
| 6,489,389 | B1 | 12/2002 | Ohta et al. |
| 7,427,646 | B2 * | 9/2008 | Kondou ...................... 524/575.5 |
| 8,163,821 | B2 | 4/2012 | Hiro |
| 8,273,804 | B2 | 9/2012 | Nishimura |
| 8,623,956 | B2 | 1/2014 | Sugimoto et al. |
| 8,633,275 | B2 | 1/2014 | Sakaki et al. |
| 8,658,728 | B2 | 2/2014 | Ichikawa et al. |
| 8,658,730 | B2 | 2/2014 | Ichikawa |
| 2004/0110889 | A1 | 6/2004 | Yagi et al. |
| 2004/0266937 | A1 | 12/2004 | Yagi et al. |
| 2005/0027060 | A1 | 2/2005 | Yagi et al. |
| 2005/0148723 | A1 | 7/2005 | Kondou |
| 2005/0234186 | A1 | 10/2005 | Kondou |
| 2006/0252879 | A1 * | 11/2006 | Tanaka et al. ................. 524/571 |
| 2007/0059232 | A1 | 3/2007 | Stenzel et al. |
| 2007/0100061 | A1 | 5/2007 | Hattori et al. |
| 2008/0185087 | A1 | 8/2008 | Galimberti et al. |
| 2009/0000721 | A1 | 1/2009 | Imoto et al. |
| 2009/0088496 | A1 | 4/2009 | Miyasaka et al. |
| 2010/0206444 | A1 | 8/2010 | Kawasaki |
| 2011/0166254 | A1 | 7/2011 | Nishimura |
| 2011/0178235 | A1 | 7/2011 | Sugimoto |
| 2011/0184118 | A1 | 7/2011 | Sugimoto et al. |
| 2011/0230613 | A1 | 9/2011 | Hiro |
| 2011/0253285 | A1 | 10/2011 | Ichikawa et al. |
| 2011/0294949 | A1 | 12/2011 | Sakaki et al. |
| 2013/0030083 | A1 | 1/2013 | Taguchi et al. |
| 2013/0098523 | A1 | 4/2013 | Tsumori et al. |
| 2013/0102722 | A1 | 4/2013 | Tsumori et al. |
| 2013/0123387 | A1 | 5/2013 | Kagawa et al. |

FOREIGN PATENT DOCUMENTS

| CN | 1572825 A | 2/2005 |
|---|---|---|
| CN | 1692128 A | 11/2005 |
| CN | 1832967 A | 9/2006 |
| CN | 1946744 A | 4/2007 |
| CN | 102245644 A | 11/2011 |
| EP | 1 484 359 A1 | 12/2004 |
| EP | 1 568 713 A1 | 8/2005 |
| EP | 1652862 A1 | 5/2006 |
| EP | 1 816 144 A1 | 8/2007 |
| EP | 2154192 A1 | 2/2010 |
| EP | 2377892 A1 | 10/2011 |
| EP | 2476708 A1 | 7/2012 |
| JP | 4-356205 A | 12/1992 |
| JP | 6-329702 A | 11/1994 |

(Continued)

OTHER PUBLICATIONS

Database WPI Week 200570 Thomson Scientific, London, GB; AN 2005-684076 (XP-002673748).
International Search Report, dated Sep. 13, 2011, issued in PCT/JP2011/063248.
International Search Report, PCT/JP2009/070824, Mar. 9, 2010.
Japanese Office Action dated Mar. 9, 2010 for Japanese Application No. 2008-318710.
Japanese Office Action dated Mar. 9, 2010 for Japanese Application No. 2008-318711.
Japanese Office Action dated Mar. 9, 2010 for Japanese Application No. 2009-019711.
Machine generated English translation of JP 06-329702 dated Nov. 29, 1994.
Machine generated English translation of JP 2006-307018 dated Nov. 9, 2006.

(Continued)

*Primary Examiner* — Ling Choi
*Assistant Examiner* — Thuy-Ai Nguyen
(74) *Attorney, Agent, or Firm* — Birch, Stewart, Kolasch & Birch, LLP

(57) ABSTRACT

The present invention provides a rubber composition for an inner liner, which can achieve both excellent low heat build-up and high flex crack growth resistance while having processability excellent enough to eliminate the need for mastication, and further has good air impermeability, and also provides a pneumatic tire produced using the rubber composition. The present invention relates to a rubber composition for an inner liner, including: a rubber component that contains a modified natural rubber with a phosphorus content of 200 ppm or less, and carbon black and/or a white filler.

14 Claims, No Drawings

(56) References Cited

FOREIGN PATENT DOCUMENTS

| | | |
|---|---|---|
| JP | 6-329838 A | 11/1994 |
| JP | 7-149955 A | 6/1995 |
| JP | 07-196850 A | 8/1995 |
| JP | 8-12814 A | 1/1996 |
| JP | 8-143606 A | 6/1996 |
| JP | 11-12306 A | 1/1999 |
| JP | 2000-344955 A | 12/2000 |
| JP | 2001-114939 A | 4/2001 |
| JP | 3294901 A | 5/2002 |
| JP | 2002-338734 A | 11/2002 |
| JP | 2003-94918 A | 4/2003 |
| JP | 2004-59803 A | 2/2004 |
| JP | 2004-059803 A | 2/2004 |
| JP | 2004-67027 A | 3/2004 |
| JP | 2004-091715 A | 3/2004 |
| JP | 2004-182905 A | 7/2004 |
| JP | 2004-250546 A | 9/2004 |
| JP | 2004-262973 A | 9/2004 |
| JP | 2004-359773 A | 12/2004 |
| JP | 2005-41960 A | 2/2005 |
| JP | 2005-82622 A | 3/2005 |
| JP | 2005-82766 A | 3/2005 |
| JP | 2005-126604 A | 5/2005 |
| JP | 2005-325206 A | 11/2005 |
| JP | 2006-16622 A | 1/2006 |
| JP | 2006-104455 A | 4/2006 |
| JP | 2006-152045 A | 6/2006 |
| JP | 2006-152171 A | 6/2006 |
| JP | 2006-152211 A | 6/2006 |
| JP | 2006-307018 A | 11/2006 |
| JP | 2007-131730 A | 5/2007 |
| JP | 2007-145898 A | 6/2007 |
| JP | 2007-169431 A | 7/2007 |
| JP | 2008-106099 A | 5/2008 |
| JP | 2008-156446 A | 7/2008 |
| JP | 2008-214608 A | 9/2008 |
| JP | 2009-1680 A | 1/2009 |
| JP | 2009-13196 A | 1/2009 |
| JP | 2009-13197 A | 1/2009 |
| JP | 2009-191132 A | 8/2009 |
| JP | 2009-262835 A | 11/2009 |
| JP | 2010-138359 A | 6/2010 |
| JP | 2010-174169 A | 8/2010 |
| JP | 2011-153221 A | 8/2011 |
| JP | 2011-225680 A | 11/2011 |
| JP | 2011-231214 A | 11/2011 |
| WO | WO 03/082925 A1 | 10/2003 |
| WO | WO 2005/012365 A1 | 2/2005 |
| WO | WO 2010/071106 A1 | 6/2010 |

OTHER PUBLICATIONS

Machine generated English translation of JP 2008-106099 dated May 8, 2008.
Notice of Allowance dated Jun. 17, 2014 for U.S. Appl. No. 13/560,090.
U.S. Office Action dated Jun. 13, 2014 for copending U.S. Appl. No. 13/672,880.
U.S. Office Action dated Jun. 23, 2014 for U.S. Appl. No. 13/699,533.
U.S. Office Action dated Mar. 4, 2014 for U.S. Appl. No. 13/560,090.
US Office Action for U.S. Appl. No. 13/616,310 dated May 7, 2014.
Rhodia, "Rhodia Silcea launches Zeosil® Premium, a new generation of high surface-area silica offering lower resistance and greater performance," Rhodia Silica News Release, Solvay-Rhodia, Lyon, France, Feb. 27, 2007, 3 pages.
U.S. Final Rejection dated Nov. 12, 2013 for U.S. Appl. No. 13/560,090.
U.S. Final Rejection dated Sep. 13, 2013 for U.S. Appl. No. 13/672,880.
U.S. Notice of Allowance dated Aug. 28, 2013 for U.S. Appl. No. 13/013,849.
U.S. Notice of Allowance dated Feb. 14, 2012 for U.S. Appl. No. 12/983,338.
U.S. Notice of Allowance dated Sep. 9, 2013 for U.S. Appl. No. 13/117,182.
U.S. Office Action dated Mar. 23, 2011 for U.S. Appl. No. 12/983,338.
U.S. Office Action dated Nov. 4, 2013 for U.S. Appl. No. 13/616,310.
U.S. Office Action dated Sep. 15, 2011 for U.S. Appl. No. 12/983,338.
U.S. Office Action dated Sep. 19, 2011 for U.S. Appl. No. 13/048,914.
US Notice of Allowance dated Feb. 1, 2012 for U.S. Appl. No. 13/048,914.
United States Office Action for copending U.S. Appl. No. 13/013,849 dated Mar. 13, 2013.
United States Office Action for copending U.S. Appl. No. 13/117,182 dated Feb. 5, 2013.
United States Office Action for copending U.S. Appl. No. 13/117,182 dated May 17, 2013.
United States Office Action for copending U.S. Appl. No. 13/560,090 dated Aug. 2, 2013.
United States Office Action for copending U.S. Appl. No. 13/672,880 dated Mar. 28, 2013.

* cited by examiner

RUBBER COMPOSITION FOR INNER LINER AND PNEUMATIC TIRE

TECHNICAL FIELD

The present invention relates to a rubber composition for an inner liner and a pneumatic tire using the same.

BACKGROUND ART

There has been an approach to decrease rolling resistance of a tire to suppress heat generation and thus achieve fuel economy of a vehicle. The demand for achieving fuel economy of a vehicle from the aspect of tires has increased in recent years. It has been desired to achieve fuel economy from the aspect of improvement of an inner liner which requires high air impermeability as well as a tread which occupies a large part of a tire. Examples of known methods for achieving low heat build-up of a rubber composition for an inner liner include a method of using a low-reinforcing filler, and a method of reducing the reinforcing filler content. Also, an attempt has been made to achieve the low heat build-up by using silica as a filler.

However, the above methods for achieving fuel economy (low heat build-up) from the aspect of fillers problematically decrease the hardness of the rubber composition, which softens the tire and decreases the flex fatigue resistance. Hence, it has been difficult to achieve both excellent low heat build-up and high flex fatigue resistance.

Meanwhile, natural rubber has been widely used for inner liners. Natural rubber has a higher Mooney viscosity than those of other synthetic rubbers and thus has low processability. Therefore, natural rubber to be used is usually added with a peptizer and then masticated so that the rubber has a decreased Mooney viscosity. Requirement of such a process in the case of using natural rubber decreases the productivity. Further, the mastication causes molecular chain scission in natural rubber, thereby problematically leading to a loss of the properties of a high-molecular-weight polymer that natural rubber essentially has (for example, high abrasion resistance, fuel economy, and rubber strength).

Patent Document 1 discloses a rubber composition prepared using natural rubber and an epoxidized natural rubber so as to increase the content of non-petroleum resources. However, the rubber composition still has room for improvement in achieving good air impermeability while achieving both low heat build-up and flex crack growth resistance, and in simultaneously improving processability.
Patent Document 1: JP 2007-169431 A

SUMMARY OF THE INVENTION

The present invention aims to provide a rubber composition for an inner liner, which solves the above problems and can achieve both excellent low heat build-up and high flex crack growth resistance while having processability excellent enough to eliminate the need for mastication, and further achieve good air impermeability. It is also an aim of the present invention to provide a pneumatic tire produced using the rubber composition.

The present invention relates to a rubber composition for an inner liner, including: a rubber component that contains a modified natural rubber with a phosphorus content of 200 ppm or less, and carbon black and/or a white filler.

The rubber composition preferably contains 1 to 30% by mass of the modified natural rubber per 100% by mass of the rubber component. The modified natural rubber preferably contains 0.3% by mass or less of nitrogen. Further, the modified natural rubber preferably has a gel content of 20% by mass or less, the gel content being determined as the content of a toluene-insoluble matter.

The modified natural rubber is preferably produced by saponifying natural rubber latex.

The white filler is preferably silica.

The present invention also relates to a method for producing the rubber composition for an inner liner, the method excluding the step of masticating the modified natural rubber.

The present invention also relates to a pneumatic tire including an inner liner produced using the rubber composition.

The rubber composition according to the present invention includes a modified natural rubber with a phosphorus content of 200 ppm or less (hereinafter, also referred to as "HPNR"), and carbon black and/or a white filler, and therefore achieves both excellent low heat build-up and high flex crack growth resistance and further has good air impermeability. The rubber composition also has processability excellent enough to eliminate the particular need for mastication.

BEST MODE FOR CARRYING OUT THE INVENTION

The rubber composition for an inner liner of the present invention includes a rubber component that contains a modified natural rubber with a phosphorus content of 200 ppm or less, and carbon black and/or a white filler. The present invention employs a modified natural rubber (HPNR) with reduced or no levels of proteins, gel fraction, and phospholipids contained in natural rubber (NR), and therefore, fuel economy can be achieved without decreasing the amount of the carbon black and/or the white filler. Accordingly, high rubber strength can be simultaneously achieved by the reinforcement effect of the filler, so that both low heat build-up and flex crack growth resistance are achieved.

Further, the rubber composition of the present invention, which contains the HPNR, has an improved air impermeability compared with rubber compositions containing only butyl rubber or a combination of butyl rubber and common NR as the rubber component. An unvulcanized rubber composition with the HPNR is excellent also in productivity because it shows good processability when being mixed with other ingredients such as a filler without being masticated beforehand.

The modified natural rubber (HPNR) has a phosphorus content of 200 ppm or less. A phosphorus content of more than 200 ppm tends to increase the gel content during storage and increase the tan δ of the vulcanized rubber composition. The phosphorus content is preferably 150 ppm or less, and more preferably 100 ppm or less. Here, the phosphorus content can be measured by a conventional method such as ICP emission spectrometry. The phosphorus is derived from phospholipids (phosphorus compounds).

The modified natural rubber preferably contains substantially no phospholipids. Here, the modified natural rubber "containing substantially no phospholipids" means that the modified natural rubber shows no peak corresponding to phospholipids between −3 ppm and 1 ppm in a $^{31}$P-NMR spectrum of an extract produced by chloroform extraction from the modified natural rubber sample. The peak corresponding to phosphorus between −3 ppm and 1 ppm refers to a peak corresponding to a phosphate ester structure in the phosphorus component of phospholipids.

The modified natural rubber preferably contains 0.3% by mass or less, and more preferably 0.15% by mass or less of nitrogen. A nitrogen content of more than 0.3% by mass tends to increase Mooney viscosity during storage. The nitrogen is derived from proteins. The nitrogen content can be determined by a conventional method such as the Kjeldahl method.

The modified natural rubber preferably has a gel content of 20% by mass or less, more preferably 15% by mass or less, and still more preferably 10% by mass or less. A gel content of more than 20% by mass tends to result in reduced processability such as increased Mooney viscosity. The gel content refers to the content determined as a matter insoluble in toluene that is a non-polar solvent. Hereinafter, such a content is also referred to simply as "gel content" or "gel fraction". The gel content is determined by the following method. First, a natural rubber sample is immersed in dehydrated toluene and is allowed to stand for one week in a dark place protected from light. Next, the toluene solution is centrifuged for 30 minutes at $1.3 \times 10^5$ rpm so that a toluene-insoluble gel fraction and a toluene-soluble fraction are separated from each other. The toluene-insoluble gel fraction is added with methanol to be solidified, and is then dried. Finally, the gel content can be determined from the ratio of the mass of the dried gel fraction to the original mass of the sample.

Examples of the method for producing the modified natural rubber include a method for producing a modified natural rubber by saponifying natural rubber latex with an alkali, washing a rubber coagulated therefrom after the saponification, and then drying the rubber. The saponification is performed by adding an alkali and optionally a surfactant to natural rubber latex and allowing the mixture to stand for a certain period at a predetermined temperature. Here, the mixture may optionally be stirred or subjected to other operations. That method removes phosphorus compounds, which are separated in the saponification, by washing, and thereby can reduce the phosphorus content in natural rubber. Further, the saponification degrades proteins in natural rubber, which makes it possible to reduce the nitrogen content in natural rubber. In the present invention, the saponification can be performed by adding an alkali to natural rubber latex, and the addition to natural rubber latex leads to efficient saponification.

Natural rubber latex is sap extracted from hevea trees and contains components such as water, proteins, lipids, and inorganic salts as well as a rubber component. A gel fraction in rubber is thought to be derived from these various impurities in a combined state. The latex used in the present invention may be raw latex taken from hevea trees by tapping the trees, or purified latex concentrated by centrifugation. Alternatively, high ammonia latex may be used which is produced by adding ammonia to raw rubber latex through a common method so as to inhibit the corruption of raw rubber latex owing to bacteria existing in the latex and to prevent coagulation of the latex.

Examples of the alkali used in the saponification include sodium hydroxide, potassium hydroxide, calcium hydroxide, and amine compounds. Among these, sodium hydroxide and potassium hydroxide are particularly preferable in terms of the saponification effects and the effects on stability of natural rubber latex.

The addition amount of the alkali is not particularly limited. The minimum addition amount of the alkali is preferably 0.1 parts by mass or more, and more preferably 0.3 parts by mass or more per 100 parts by mass of the solids in natural rubber latex. The maximum addition amount of the alkali is preferably 12 parts by mass or less, more preferably 10 parts by mass or less, still more preferably 7 parts by mass or less, and particularly preferably 5 parts by mass or less per 100 parts by mass of the solids in natural rubber latex. An addition amount of the alkali of less than 0.1 parts by mass may require a long time for saponification. On the other hand, an addition amount of the alkali of more than 12 parts by mass may destabilize natural rubber latex.

The surfactant to be used may be an anionic surfactant, nonionic surfactant, or ampholytic surfactant. Examples of the anionic surfactant include carboxylic acid anionic surfactants, sulfonic acid anionic surfactants, sulfate anionic surfactants, and phosphate anionic surfactants. Examples of the nonionic surfactant include polyoxyalkylene ether nonionic surfactants, polyoxyalkylene ester nonionic surfactants, polyhydric alcohol fatty acid ester nonionic surfactants, sugar fatty acid ester nonionic surfactants, and alkyl polyglycoside nonionic surfactants. Examples of the ampholytic surfactant include amino acid ampholytic surfactants, betaine ampholytic surfactants, and amine oxide ampholytic surfactants.

The minimum addition amount of the surfactant is preferably 0.01 parts by mass or more, and more preferably 0.1 parts by mass or more per 100 parts by mass of the solids of natural rubber latex. The maximum addition amount of the surfactant is preferably 6 parts by mass or less, more preferably 5 parts by mass or less, still more preferably 3.5 parts by mass or less, and particularly preferably 3 parts by mass or less per 100 parts by mass of the solids of natural rubber latex. An addition amount of the surfactant of less than 0.01 parts by mass may destabilize natural rubber latex during the saponification. On the other hand, an addition amount of the surfactant of more than 6 parts by mass may excessively stabilize natural rubber latex, which may make it difficult for the natural rubber latex to coagulate.

The temperature during the saponification can be appropriately set within a range that allows the saponification with an alkali to proceed at a sufficient reaction rate, and within a range that does not cause natural rubber latex to be subjected to denaturation such as coagulation. Generally, the temperature during the saponification is preferably 20° C. to 70° C., and more preferably 30° C. to 70° C. Further, the period of the saponification in the case of allowing natural rubber latex to stand statically during the saponification is preferably 3 to 48 hours, and more preferably 3 to 24 hours in terms of sufficient level of saponification and improvement of productivity. The length of the period depends on the temperature during the saponification.

After the saponification, coagulation is performed and the coagulated rubber is broken up and then washed. Examples of the coagulation method include a method of adding an acid such as formic acid to latex so as to adjust the pH of the latex. Examples of the washing method include a method of diluting the coagulated rubber with water for washing, and centrifuging the mixture to extract the rubber. Before the centrifugation, the dilution with water is first performed so that the content of the rubber formed from natural rubber latex is 5 to 40% by mass, and preferably 10 to 30% by mass. Next, the diluted rubber mixture may be centrifuged for 1 to 60 minutes at 5000 to 10000 rpm. After the completion of washing, a saponification-treated natural rubber latex can be produced. Then, drying the saponification-treated natural rubber latex provides the modified natural rubber of the present invention.

In the production method, the saponification, washing, and drying are preferably completed within 15 days after natural rubber latex is extracted. Further, it is more preferable to complete the saponification, washing, and drying within 10 days, and more preferably within 5 days after the latex is extracted. This is because the gel content increases if the latex is left to stand for more than 15 days without being solidified after extraction.

In the rubber composition of the present invention, the amount of the modified natural rubber in 100% by mass of the rubber component is preferably 1% by mass or more and more preferably 5% by mass or more. An amount of the modified natural rubber of less than 1% by mass may fail to achieve excellent low heat build-up. The amount of the modified natural rubber in 100% by mass of the rubber component is preferably 30% by mass or less, more preferably 25% by mass or less, still more preferably 20% by mass or less, and particularly preferably 10% by mass or less. An amount of the modified natural rubber of more than 30% by mass may fail to achieve high air impermeability.

In the present invention, a butyl rubber is preferably used in combination with the modified natural rubber in terms of air impermeability. Examples of the butyl rubber include: halogenated butyl rubbers (X-IIR) such as brominated butyl rubber (Br-IIR) and chlorinated butyl rubber (Cl-IIR); and butyl rubber (IIR). Each of these butyl rubbers may be used alone or two or more kinds of these may be used in combination. It is preferable in terms of low heat build-up that X-IIR such as Cl-IIR is used.

In the present invention, when the rubber composition contains the butyl rubber as the rubber component, the amount of the butyl rubber in 100% by mass of the rubber component is preferably 70% by mass or more, more preferably 80% by mass or more, and still more preferably 95% by mass or more. An amount of the butyl rubber of less than 70% by mass may fail to achieve excellent air impermeability. The amount of the butyl rubber in 100% by mass of the rubber component is preferably 99% by mass or less. An amount of the butyl rubber of more than 99% by mass may fail to achieve good fuel economy.

In the present invention, other usable rubbers include natural rubber (NR), isoprene rubber (IR), butadiene rubber (BR), styrene butadiene rubber (SBR), acrylonitrile butadiene rubber (NBR), chloroprene rubber (CR), and the like.

Examples of the carbon black include, but not particularly limited to, GPF, FEF, HAF, ISAF, and SAF. The use of the carbon black brings the reinforcement effect, and thereby, the resulting rubber composition can show good flex crack growth resistance. Accordingly, the use of the carbon black in combination with the HPNR brings favorable effects of the present invention.

The nitrogen adsorption specific surface area ($N_2SA$) of the carbon black is preferably 10 $m^2/g$ or larger, more preferably 20 $m^2/g$ or larger, and still more preferably 23 $m^2/g$ or larger. An $N_2SA$ of smaller than 10 $m^2/g$ may result in insufficient cohesion and rubber strength. Also, the $N_2SA$ of the carbon black is preferably 150 $m^2/g$ or smaller, more preferably 120 $m^2/g$ or smaller, and still more preferably 100 $m^2/g$ or smaller. An $N_2SA$ of larger than 150 $m^2/g$ may decrease processability and increase heat build-up.

The nitrogen adsorption specific surface area of the carbon black herein can be determined in accordance with the method A described in JIS K6217.

When the rubber composition contains the carbon black, the amount of the carbon black is preferably 5 parts by mass or more, more preferably 10 parts by mass or more, and still more preferably 15 parts by mass or more per 100 parts by mass of the rubber component. An amount of the carbon black of less than 5 parts by mass may result in insufficient abrasion resistance, cohesion and rubber strength. The amount of the carbon black is preferably 100 parts by mass or less, more preferably 80 parts by mass or less, and still more preferably 60 parts by mass or less per 100 parts by mass of the rubber component. An amount of the carbon black of more than 100 parts by mass tends to decrease dispersibility and processability.

The white filler may be a filler generally used in the rubber industry, including silica, calcium carbonate, mica such as sericite, aluminum hydroxide, magnesium oxide, magnesium hydroxide, clay, talc, alumina, or titanium oxide. Among these, silica is preferable in terms of fuel economy and rubber strength.

Examples of the silica include, but are not particularly limited to, silica produced through a dry process (anhydrous silicic acid) and/or silica produced through a wet process (hydrous silicic acid), and the like. Among these, silica produced through a wet process (hydrous silicic acid) is preferable in that such silica contains a large number of silanol groups.

The nitrogen adsorption specific surface area of the silica according to the BET method is preferably 30 $m^2/g$ or larger, and more preferably 100 $m^2/g$ or larger. A nitrogen adsorption specific surface area of the silica of smaller than 30 $m^2/g$ tends to decrease the breaking strength of the rubber composition after vulcanization. Also, the nitrogen adsorption specific surface area of the silica according to the BET method is preferably 500 $m^2/g$ or smaller, more preferably 300 $m^2/g$ or smaller, and still more preferably 200 $m^2/g$ or smaller. A nitrogen adsorption specific surface area of the silica of larger than 500 $m^2/g$ tends to decrease processability. Here, the nitrogen adsorption specific surface area of the silica according to the BET method can be determined by a method in accordance with ASTM-D-4820-93.

The rubber composition preferably contains 5 parts by mass or more, more preferably 10 parts by mass or more, and still more preferably 30 parts by mass or more, of the silica per 100 parts by mass of the rubber component. An amount of the silica of less than 5 parts by mass may result in insufficient fuel economy. Also, the rubber composition preferably contains 100 parts by mass or less, and more preferably 80 parts by mass or less, of the silica per 100 parts by mass of the rubber component. An amount of the silica of more than 100 parts by mass tends to decrease processability.

The rubber composition of the present invention preferably contains a silane coupling agent together with the silica. Examples thereof include: sulfide-type silane coupling agents, mercapto-type silane coupling agents, vinyl-type silane coupling agents, amino-type silane coupling agents, glycidoxy-type silane coupling agents, nitro-type silane coupling agents, and chloro-type silane coupling agents. Among these, preferred are sulfide-type silane coupling agents such as bis(3-triethoxysilylpropyl)tetrasulfide, bis(2-triethoxysilylethyl)tetrasulfide, bis(3-triethoxysilylpropyl)disulfide, and bis(2-triethoxysilylethyl)disulfide, and particularly preferred is bis(3-triethoxysilylpropyl)disulfide.

When the rubber composition contains the silane coupling agent, the amount of the silane coupling agent is preferably 2 parts by mass or more, and more preferably 4 parts by mass or more per 100 parts by mass of the silica. An amount of the silane coupling agent of less than 2 parts by mass may deteriorate rubber strength and abrasion resistance. Also, the amount of the silane coupling agent is preferably 15 parts by mass or less, and more preferably 13 parts by mass or less per 100 parts by mass of the silica. An amount of the silane coupling agent of more than 15 parts by mass may not lead to improvement in rubber strength and abrasion resistance, and the cost tends to increase.

In the rubber composition of the present invention, the total amount of the carbon black and the white filler is preferably 30 parts by mass or more, more preferably 35 parts by mass or more, and still more preferably 40 parts by mass or more per 100 parts by mass of the rubber component. A total amount of the carbon black and the white filler of less than 30 parts by mass may lead to insufficient abrasion resistance. Also, the total amount of the carbon black and the white filler is preferably 150 parts by mass or less, more preferably 120 parts by mass or less, and still more preferably 100 parts by mass or less per 100 parts by mass of the rubber component. A total amount of the carbon black and the white filler of more than 150 parts by mass may decrease processability and may lead to insufficient low heat build-up.

The rubber composition of the present invention may optionally contain compounding ingredients generally used for producing a rubber composition, in addition to the ingredients described above. Examples of the compounding ingredients include zinc oxide, stearic acid, various age resistors, oils such as aromatic oils, waxes, vulcanizing agents, and vulcanization accelerators.

The rubber composition of the present invention is produced by a common method. Specifically, for example, the respective ingredients described above are mixed by an apparatus such as a Banbury mixer, a kneader, or an open roll mill, and then vulcanized, whereby a rubber composition can be produced. When a rubber composition containing natural rubber is produced, the natural rubber is usually masticated before the mixing of the respective ingredients such as a rubber component and a filler. According to the present invention in which the modified natural rubber is used, if the rubber composition contains no (unmodified) natural rubber, the mixing can be carried out well without the mastication, so that a desired rubber composition can be produced.

The rubber composition of the present invention is used for an inner liner that is formed as the inner cavity surface of a tire, and this tire component can hold the inner pressure of the tire by reducing air permeability. More specifically, the rubber composition can be used for tire components disclosed in FIG. 1 of JP 2008-291091 A, FIGS. 1 and 2 of JP 2007-160980 A, and the like.

The pneumatic tire of the present invention is produced using the above rubber composition by a common method. Specifically, an unvulcanized rubber composition with the additives optionally blended therein is extruded and processed into the shape of a tire inner liner, and then assembled with other tire components and molded in a usual manner on a tire building machine to obtain an unvulcanized tire. This unvulcanized tire is then subjected to heating and pressing in a vulcanizer, whereby a tire can be produced.

The tire including an inner liner produced using the rubber composition of the present invention is particularly suitably used as tires for passenger vehicles, and tires for trucks and busses.

EXAMPLES

The following will more specifically mention the present invention with reference to Examples, but the present invention is not limited thereto.

The respective chemical agents and the like used in Examples are mentioned below.
Natural rubber latex: field latex obtained from Thaitex
Saponified natural rubber A: the following Preparation 1
Saponified natural rubber B: the following Preparation 2
Untreated natural rubber: the following Preparation 3
TSR: natural rubber (TSR)
Butyl rubber: chlorinated butyl rubber (Exxon chlorobutyl 1066, produced by Exxon Mobile Corporation)
Carbon black: SEAST V (N660, $N_2SA$: 27 $m^2/g$) produced by TOKAI CARBON CO., LTD.
Silica: Silica 115Gr (BET specific surface area: 110 $m^2/g$) produced by Rhodia Japan
Silane coupling agent: Si266 (bis(3-triethoxysilylpropyl)disulfide) produced by Degussa AG
Zinc oxide: Zinc oxide #1 produced by Mitsui Mining & Smelting Co., Ltd.
Stearic acid: Stearic acid "TSUBAKI" produced by NOF Corporation
Age resistor: Antage RD (Polymerized 2,2,4-trimethyl-1,2-dihydroquinoline) produced by Kawaguchi Chemical Industry Co., LTD.
Sulfur: sulfur powder produced by Tsurumi Chemical Industry Co., Ltd.
Vulcanization accelerator A: NOCCELER DM (di-2-benzothiazolyl disulfide) produced by Ouchi Shinko Chemical Industrial Co., Ltd.
Vulcanization accelerator B: NOCCELER M (2-mercaptobenzothiazole) produced by Ouchi Shinko Chemical Industrial Co., Ltd.
Surfactant: Emal-E produced by KaO Corporation
NaOH: NaOH produced by Wako Chemical Industries, Ltd.

(Production of Natural Rubber Saponified with Alkali)

Preparation 1

The solid content (DRC) of natural rubber latex was adjusted to 30% (w/v). Next, 1000 g of the natural rubber latex was added with 10 g of Emal-E and 20 g of NaOH and then saponified for 48 hours at room temperature, whereby a saponified natural rubber latex was produced. The saponified latex was added with water to be diluted to a DRC of 15% (w/v). The diluted latex was then added with formic acid, while being slowly stirred, so that the pH was adjusted to 4.0 to 4.5. The latex was coagulated, and the coagulated rubber was broken up and repeatedly washed with 1000 ml of water. Then, the rubber was dried for two hours at 110° C., and thereby a solid rubber (saponified natural rubber A) was produced.

Preparation 2

The solid content (DRC) of natural rubber latex was adjusted to 30% (w/v). Next, 1000 g of the natural rubber latex was added with 10 g of Emal-E and 15 g of NaOH and then saponified for 48 hours at room temperature, whereby a saponified natural rubber latex was produced. The saponified latex was added with water to be diluted to a DRC of 15% (w/v). The diluted latex was then added with formic acid, while being slowly stirred, so that the pH was adjusted to 4.0 to 4.5. The latex was coagulated, and the coagulated rubber was broken up and repeatedly washed with 1000 ml of water. Then, the rubber was dried for two hours at 110° C., and thereby a solid rubber (saponified natural rubber B) was produced.

Preparation 3

The solid content (DRC) of natural rubber latex was adjusted to 30% (w/v). Next, the natural rubber latex was added with formic acid, while being slowly stirred, so that the pH was adjusted to 4.0 to 4.5. The latex was coagulated, and the coagulated rubber was broken up and dried for two hours at 110° C., and thereby a solid rubber (untreated natural rubber) was produced.

TSR and the solid rubbers produced in Preparations 1 to 3 were determined for nitrogen content, phosphorus content, and gel content by the following methods. Table 1 shows the results.

(Determination of Nitrogen Content)

The nitrogen content was determined with CHN CORDER MT-5 (produced by Yanaco Analytical Instruments Corp.). In determination, first, a calibration curve for determining the nitrogen content was prepared with antipyrin taken as a reference material. Then, about 10 mg of TSR or the natural rubber produced in each Preparation was weighed out and subjected to the determination. From three determination results, the average value was calculated, which was regarded as the nitrogen content of the sample.

(Determination of Phosphorus Content)

The phosphorus content was determined with ICP emission spectrometer (ICPS-8100, produced by Shimadzu Corporation).

(Determination of Gel Content)

Each of raw rubber samples cut with a size of 1 mm×1 mm was weighed out (70.00 mg), added with 35 mL of toluene, and allowed to stand for one week in a cool and dark place. Next, the mixture was centrifuged such that a toluene-insoluble gel fraction was precipitated and a toluene-soluble supernatant was removed. Then, the gel fraction alone was solidified with methanol and dried. The mass of the dried gel fraction was measured, and then used in the following formula to determine the gel content (%).

Gel content(% by mass)=[(Mass of dried gel fraction (mg))/(Mass of original sample(mg))]×100

TABLE 1

|  | Saponified natural rubber A (Preparation 1) | Saponified natural rubber B (Preparation 2) | Untreated natural rubber (Preparation 3) | TSR |
|---|---|---|---|---|
| Nitrogen content (% by mass) | 0.12 | 0.25 | 0.32 | 0.33 |
| Phosphorus content (ppm) | 84 | 123 | 359 | 572 |
| Gel content (% by mass) | 5.5 | 14.2 | 25.3 | 26.9 |

As shown in Table 1, the saponified natural rubbers A and B were found to have a decreased nitrogen content, phosphorus content and gel content compared with the untreated natural rubber and TSR.

Examples 1 to 9 and Comparative Examples 1 to 9

Production of Rubber Test Sample and Tire

In accordance with each formulation shown in Tables 2 to 4, the chemical agents other than the sulfur and the vulcanization accelerator(s) were mixed by a 1.7-L Banbury mixer. Next, the sulfur and the vulcanization accelerator(s) were added to the resultant mixture, and they were mixed with an open roll mill. Thereby, an unvulcanized rubber composition was produced. Note that in Comparative Examples 2, 5, and 8 where TSR was used, a peptizer was added in an amount of 0.4 parts by mass per 100 parts by mass of the rubber component of TSR, and the mixture was masticated by the 1.7-L Banbury mixer beforehand. On the other hand, the natural rubbers in Examples 1 to 9 and Comparative Examples 1, 3, 4, 6, 7, and 9 were not masticated.

Next, the unvulcanized rubber composition produced thereby was press-vulcanized in a mold with 2 mm in thickness for 15 minutes at 170° C., whereby a vulcanized rubber composition (vulcanized rubber sheet) was produced.

The unvulcanized rubber composition produced thereby was also molded into the shape of an inner liner on a tire building machine, and then assembled with other tire components to obtain an unvulcanized tire. The unvulcanized tire was then vulcanized for 30 minutes at 150° C. Thereby, a test tire was produced.

The produced unvulcanized rubber compositions, vulcanized rubber compositions, and test tires were evaluated in the following ways. Tables 2 to 4 show the evaluation results.

(Determination of Mooney Viscosity)

The produced unvulcanized rubber compositions were determined for Mooney viscosity at 130° C. in accordance with the determination method of Mooney viscosity specified in JIS K 6300. The Mooney viscosity ($ML_{1+4}$) of each unvulcanized rubber composition was expressed as an index relative to that of Comparative Example 1, 4, or 7 regarded as 100. The larger the index, the lower the Mooney viscosity, which indicates more excellent processability.

(Low Heat Build-Up, Tan δ)

The loss tangent, tan δ, at 70° C. of the vulcanized rubber sheets was determined with a viscoelasticity spectrometer (produced by Iwamoto Seisakusho Co., Ltd.) under the following conditions: a frequency of 10 Hz; an initial strain of 10%; and a dynamic strain of 2%. The smaller the tan δ, the less heat is generated, which indicates lower heat build-up and thus rolling resistance can be decreased. The inverse of the tan δ of each vulcanized rubber sheet was expressed as a low heat build-up index relative to that of Comparative Example 1, 4, or 7 regarded as 100. The larger the index, the smaller the tan δ, which indicates more excellent low heat build-up.

(Flex Crack Growth Resistance Test)

A sample prepared from each of the vulcanized rubber sheets was subjected to a flex crack growth test in accordance with JIS K 6260 "Testing method of flex cracking and crack growth for rubber, vulcanized or thermoplastic (De Mattia)". In the test, the rubber sheet sample was flexed at 70% elongation repeatedly 1,000,000 times, and then the length of a generated crack was measured. The inverse of the measured value (length) of each sample was expressed as a flex crack growth resistance index relative to that of Comparative Example 1, 4, or 7 regarded as 100. The larger the index, the smaller the crack growth, which indicates more favorable performance.

(Static Air-Pressure Decrease Rate Test, Tire Air Leakage)

Each of the test tires was mounted on a rim (15×6 JJ in JIS) and adjusted to an initial air pressure of 300 KPa. After being allowed to stand for 90 days at room temperature, the respective test tires were determined for the rate of decrease in air pressure. The inverse of the determined rate of each test tire was expressed as a static air-pressure decrease rate index relative to that of Comparative Example 1, 4, or 7 regarded as 100. The larger the index, the smaller the air-pressure decrease rate, which indicates better performance.

TABLE 2

(Carbon black blended (60 parts))

|  |  | Comparative Example 1 | Comparative Example 2 | Example 1 | Example 2 | Example 3 | Comparative Example 3 |
|---|---|---|---|---|---|---|---|
| Formulation (part(s) by mass) | Saponified natural rubber A (Preparation 1) | — | — | 5 | — | 20 | — |
|  | Saponified natural rubber B (Preparation 2) | — | — | — | 5 | — | — |
|  | Untreated natural rubber (Preparation 3) | — | — | — | — | — | 5 |
|  | TSR | — | 5 | — | — | — | — |
|  | Butyl rubber | 100 | 95 | 95 | 95 | 80 | 95 |
|  | Carbon black | 60 | 60 | 60 | 60 | 60 | 60 |
|  | Zinc oxide | 4 | 4 | 4 | 4 | 4 | 4 |
|  | Stearic acid | 2 | 2 | 2 | 2 | 2 | 2 |
|  | Age resistor | 1 | 1 | 1 | 1 | 1 | 1 |
|  | Sulfur | 1 | 1 | 1 | 1 | 1 | 1 |
|  | Valucanization accelerator A | 1.5 | 1.5 | 1.5 | 1.5 | 1.5 | 1.5 |
| Evaluation | Mooney viscosity (index) | 100 | 105 | 110 | 108 | 120 | 85 |
|  | Low heat build-up (tan δ) (index) | 100 | 105 | 115 | 112 | 121 | 102 |
|  | Flex crack growth resistance (index) | 100 | 90 | 105 | 102 | 100 | 90 |
|  | Static air-pressure decrease rate (index) | 100 | 90 | 110 | 107 | 105 | 92 |

TABLE 3

(Carbon black blended (20 parts))

|  |  | Comparative Example 4 | Comparative Example 5 | Example 4 | Example 5 | Example 6 | Comparative Example 6 |
|---|---|---|---|---|---|---|---|
| Formulation (part(s) by mass) | Saponified natural rubber A (Preparation 1) | — | — | 5 | — | 20 | — |
|  | Saponified natural rubber B (Preparation 2) | — | — | — | 5 | — | — |
|  | Untreated natural rubber (Preparation 3) | — | — | — | — | — | 5 |
|  | TSR | — | 5 | — | — | — | — |
|  | Butyl rubber | 100 | 95 | 95 | 95 | 80 | 95 |
|  | Carbon black | 20 | 20 | 20 | 20 | 20 | 20 |
|  | Zinc oxide | 4 | 4 | 4 | 4 | 4 | 4 |
|  | Stearic acid | 2 | 2 | 2 | 2 | 2 | 2 |
|  | Age resistor | 1 | 1 | 1 | 1 | 1 | 1 |
|  | Sulfur | 1 | 1 | 1 | 1 | 1 | 1 |
|  | Valucanization accelerator A | 1.5 | 1.5 | 1.5 | 1.5 | 1.5 | 1.5 |
| Evaluation | Mooney viscosity (index) | 100 | 105 | 111 | 109 | 122 | 90 |
|  | Low heat build-up (tan δ) (index) | 100 | 105 | 118 | 116 | 127 | 103 |
|  | Flex crack growth resistance (index) | 100 | 90 | 110 | 108 | 106 | 92 |
|  | Static air-pressure decrease rate (index) | 100 | 90 | 109 | 108 | 106 | 93 |

Table 3 shows that in case of containing 20 parts by mass of carbon black, the rubber compositions in Examples, each of which contained the saponified natural rubber (modified natural rubber) as the rubber component, achieved both favorable low heat build-up and flex crack growth resistance compared with the rubber compositions in Comparative Examples, each of which contained no saponified natural rubber. Further, the rubber compositions in Examples had improved processability and air impermeability compared with those in Comparative Examples. In addition, the rubber composition containing 20% by mass of the saponified natural rubber per 100% by mass of the rubber component had further improved processability and low heat build-up compared with the rubber compositions containing 5% by mass of the saponified natural rubber.

Table 2 shows that the rubber compositions containing 60 parts by mass of carbon black also had a tendency like that shown in Table 3.

TABLE 4

(Silica blended)

| | | Comparative Example 7 | Comparative Example 8 | Example 7 | Example 8 | Example 9 | Comparative Example 9 |
|---|---|---|---|---|---|---|---|
| Formulation (part(s) by mass) | Saponified natural rubber A (Preparation 1) | — | — | 5 | — | 20 | — |
| | Saponified natural rubber B (Preparation 2) | — | — | — | 5 | — | — |
| | Untreated natural rubber (Preparation 3) | — | — | — | — | — | 5 |
| | TSR | — | 5 | — | — | — | — |
| | Butyl rubber | 100 | 95 | 95 | 95 | 80 | 95 |
| | Silica | 50 | 50 | 50 | 50 | 50 | 50 |
| | Silane coupling agent | 4 | 4 | 4 | 4 | 4 | 4 |
| | Zinc oxide | 4 | 4 | 4 | 4 | 4 | 4 |
| | Stearic acid | 2 | 2 | 2 | 2 | 2 | 2 |
| | Age resistor | 1 | 1 | 1 | 1 | 1 | 1 |
| | Sulfur | 1 | 1 | 1 | 1 | 1 | 1 |
| | Valucanization accelerator A | 0.5 | 0.5 | 0.5 | 0.5 | 0.5 | 0.5 |
| | Valucanization accelerator B | 1 | 1 | 1 | 1 | 1 | 1 |
| Evaluation | Mooney viscosity (index) | 100 | 106 | 115 | 111 | 125 | 92 |
| | Low heat build-up (tan δ) (index) | 100 | 107 | 120 | 118 | 129 | 101 |
| | Flex crack growth resistance (index) | 100 | 90 | 105 | 104 | 102 | 86 |
| | Static air-pressure decrease rate (index) | 100 | 90 | 114 | 112 | 108 | 95 |

Table 4 shows that the rubber compositions of Examples with silica blended therein also provided the same improvement effects as those with carbon black blended therein.

The invention claimed is:

1. A pneumatic tire having an inner liner produced from a rubber composition for an inner liner, comprising:
    a rubber component that contains a modified natural rubber with a phosphorus content of 200 ppm or less, and carbon black and/or a white filler.
2. The pneumatic tire according to claim 1,
    wherein the rubber composition contains 1 to 30% by mass of the modified natural rubber per 100% by mass of the rubber component.
3. The pneumatic tire according to claim 1,
    wherein the modified natural rubber contains 0.3% by mass or less of nitrogen.
4. The pneumatic tire according to claim 1,
    wherein the modified natural rubber has a gel content of 20% by mass or less, the gel content being determined as the content of a toluene-insoluble matter.
5. The pneumatic tire according to claim 1,
    wherein the modified natural rubber is a saponified natural rubber latex.
6. The pneumatic tire according to claim 1,
    wherein the white filler is silica.
7. A method for producing the pneumatic tire according to claim 1, the method excluding the step of
    masticating the modified natural rubber.
8. The pneumatic tire according to claim 1,
    wherein the modified natural rubber is produced by saponifying natural rubber latex with an alkali, and repeatedly washing a rubber coagulated therefrom after the saponification and removing a phosphorus compound separated in the saponification through the washing.
9. The pneumatic tire according to claim 1,
    wherein the modified natural rubber contains 0.15% by mass or less of nitrogen.
10. The pneumatic tire according to claim 1, which wherein the rubber component further contains a butyl rubber, and the amount of the butyl rubber in 100% by mass of the rubber component is 70 to 99% by mass.
11. The pneumatic tire rubber composition for an inner liner according to claim 1,
    wherein the amount of the carbon black is 5 to 100 parts by mass per 100 parts by mass of the rubber component.
12. The pneumatic tire according to claim 6,
    wherein the amount of the silica is 5 to 100 parts by mass per 100 parts by mass of the rubber component.
13. The pneumatic tire according to claim 1, wherein the modified natural rubber contains substantially no phospholipids.
14. The pneumatic tire according to claim 1, wherein the modified natural rubber shows no peak corresponding to phospholipids between −3 ppm and 1 ppm in a $^{31}$P-NMR spectrum of an extract produced by chloroform extraction from the modified natural rubber.

* * * * *